(12) United States Patent
Shimozono et al.

(10) Patent No.: US 8,234,849 B2
(45) Date of Patent: Aug. 7, 2012

(54) LAWNMOWER

(75) Inventors: Kazuki Shimozono, Wako (JP); Tetsuo Iida, Wako (JP); Hiroshi Kobayashi, Wako (JP); Nobuyuki Hirose, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/074,346

(22) Filed: Mar. 29, 2011

(65) Prior Publication Data

US 2011/0239616 A1  Oct. 6, 2011

(30) Foreign Application Priority Data

Mar. 30, 2010  (JP) ................................. 2010-078998

(51) Int. Cl.
*A01D 67/00* (2006.01)
(52) U.S. Cl. ...................... 56/320.2; 56/320.1
(58) Field of Classification Search .................. 56/17.4, 56/202, 320.1, 320.2
See application file for complete search history.

(56) References Cited

U.S. PATENT DOCUMENTS

| | | | | |
|---|---|---|---|---|
| 5,179,823 A | * | 1/1993 | Pace ............................... | 56/16.9 |
| 6,735,932 B2 | * | 5/2004 | Osborne ....................... | 56/320.1 |
| 6,751,937 B2 | * | 6/2004 | Kobayashi et al. ............. | 56/202 |
| 6,843,048 B2 | * | 1/2005 | Osborne ....................... | 56/320.2 |
| 6,862,875 B2 | * | 3/2005 | Iida et al. ..................... | 56/320.2 |
| 6,874,310 B2 | * | 4/2005 | Osborne ....................... | 56/320.2 |
| 7,249,450 B2 | * | 7/2007 | Iida et al. ..................... | 56/320.2 |

FOREIGN PATENT DOCUMENTS

JP     2003-274726     9/2003

* cited by examiner

*Primary Examiner* — Thomas B Will
*Assistant Examiner* — Mai Nguyen
(74) *Attorney, Agent, or Firm* — Rankin, Hill & Clark LLP

(57) ABSTRACT

A rotary lawnmower includes a shutter for switching a location to which grass cut by the blade is to be discharged, and a shutter operating mechanism for operating the shutter. The shutter operating mechanism has a first shaft, a second shaft, a first link arm, and a second link arm, a third link arm, and an operating lever. The first shaft is positioned on the housing. The first link arm is capable of swinging about the first shaft and has the operating lever. The second shaft is positioned adjacent to and parallel to the first shaft, is rotatably attached to the housing, and is linked to the shutter via the third link arm. The second link arm is attached to the second shaft in such a manner as to be restricted in relative rotation but capable of swinging about the second shaft, and is swing-driven by the first link arm.

6 Claims, 11 Drawing Sheets

LAWNMOWER

FIELD OF THE INVENTION

The present invention relates generally to a rotary lawnmower in which a blade rotates and, more particularly, to a shutter operating mechanism for switching from one location to another to which grass cut by the blade is to be discharged.

BACKGROUND OF THE INVENTION

In rotary lawnmowers, a blade housed within a housing that is open at the bottom is caused to rotate over grass, thereby cutting it. Such lawnmowers include those having a format in which a bagging mode is employed. In lawnmowers in which a bagging mode is employed, the grass cut by the blade (i.e. cut grass) is stored in a bag or other container for cut grass. All of the cut can grass can be disposed of to give the cutting site a neat appearance, and these mowers are frequently employed on golf courses and the like. An example lawnmower in which a bagging mode is employed is disclosed in Japanese Patent No. 3771507.

The lawnmower disclosed in Japanese Patent No. 3771507 can be switched by hand between a bagging mode, in which the shutter is fully open, and the cut grass is stored in a cut-grass container; a mulching mode, in which the shutter is fully closed, and the cut grass is discharged to the area below the housing; and intermediate modes between the bagging mode and the mulching mode, in which the shutter is manually set to any desired degree of opening.

The housing is provided with a conduit through which cut grass is discharged. The cut-grass container can be attached to this discharge conduit. A shutter is positioned within the housing. The shutter can revolve along the inner circumferential surface of the housing, where the center of revolution is the center of rotation of the blade. The degree of opening of the discharge conduit for cut grass is adjusted by the shutter. An operating lever is attached to the shutter via an arm. The operating lever can be operated and made to revolve, where the center of revolution is the center of rotation of the blade. The angle of revolution (angle of operation) of the operating lever is the same as the angle of revolution (angle of opening or closing) of the shutter.

The angle of opening or closing when the shutter is swung from completely open to completely closed is determined according to the size of the housing and of the aperture of the discharge conduit for cut grass. The aperture is relatively large, and the angle of opening and closing must therefore also be large. On the other hand, the operating angle when the operating lever is operated from fully open to fully closed, and the range of motion of the arm are subject to the limitations resulting from the positions of other members in the lawnmower. In other words, the operating angle and the range of motion of the arm must be kept within a range such that the operating lever does not interfere with the engine or other members.

If the lawnmower is large in size, the housing will be large, so that such interference will not occur. However, when the lawnmower is small in scale, the housing is small. There is therefore room for improvement in adequately allowing for the operating angle necessary for opening and closing shutter within the limits of these constraints.

SUMMARY OF THE INVENTION

It is an object of the present invention to provide technology that allows the operating angle necessary for opening and closing a shutter to be fully ensured.

According to the present invention, there is provided a lawnmower, which comprises: a cutting blade rotatable about a shaft extending substantially perpendicularly to a lawn; an open-bottomed housing for housing the blade; a conduit through which to discharge cut grass, the conduit extending rearwardly from the housing and designed to allow attachment thereto of a cut-grass container; a shutter capable of revolving about the shaft for adjusting a degree of opening of the cut-grass discharge conduit; and a shutter operating mechanism for operating the shutter, wherein the shutter operating mechanism has an operating lever, a first shaft, a second shaft, a first link arm, and a second link arm; the first shaft is positioned on the housing, the second shaft is positioned adjacent to and parallel to the first shaft, is rotatably attached to the housing and is linked to the shutter, the first link arm is swingable about the first shaft and has the operating lever, and the second link arm is attached to the second shaft such that rotation of the second link arm relative to the second shaft is restricted but the second link arm is capable of swinging about the second shaft, and is linked to the first link arm such that the second link arm is swing-driven by the first link arm.

In the present invention, the shutter operating mechanism comprises the assembly of the operating lever, the first shaft, the second shaft, the first link arm, and the second link arm. The second shaft is positioned adjoining with and parallel to the first shaft and is linked to the shutter. Operating the operating lever causes the first link arm to swing, the first shaft being the center of the swinging. The second link arm is swung by the first link arm and causes the second shaft to rotate. As a result, the second shaft rotates, whereby the shutter is made to open or close.

Thus, since the two shafts and the two link arms are assembled, the ratio of the length of the second link arm to the length of the first link arm (arm-length ratio) can be made small. By setting the arm-length ratio to be small, the ratio of the swing angle of the second link arm to the swing angle of the first link arm (the operating lever) is increased. As a result, the opening and closing angle of the shutter is made larger than the operating angle of the operating lever.

The opening and closing angle over which the shutter revolves from fully open to fully closed is determined according to the size of the housing and the size of the aperture of the discharge conduit for cut grass. The aforedescribed arm-length ratio may be set smaller in order to reduce the operating angle of the operating lever in relation to the opening and closing angle. By reducing the operating angle of the operating lever, the operating angle can be kept within a range in which the operating lever does not interfere with the engine or other members, and the operating angle needed to open and close the shutter can be adequately provided.

The second shaft is positioned adjoining with and parallel to the first shaft. The first and second link arms can therefore be brought into proximity. As a result, the space occupied by the shutter operating mechanism can be reduced. The shutter operating mechanism can therefore be adequately positioned even when the lawnmower is small in scale.

Preferably, the second shaft is linked to the shutter via a third link arm. The second shaft can therefore be disposed in the desired position relative to the shutter. The second shaft can therefore be disposed in a more appropriate position in the small-scale lawnmower so as to allow the space occupied by the shutter operating mechanism to be reduced.

Desirably, the lawnmower further comprises an operating guide part for guiding the operating lever through an operating direction. It is also desirable that the operating guide part have a horizontal oblong guiding hole and a plurality of positioning grooves, the oblong guiding hole being for guiding the operating lever in a swinging direction of the first link arm, the positioning grooves being aligned in a row along a lower edge of the oblong guiding hole, that the positioning grooves comprise open-topped vertical grooves for setting the operating lever to a desired swing-operating position, and that the operating lever be urged by an urging member in a direction for fitting into any one of the positioning grooves from the oblong guiding hole when an operating force is discontinued. When the operating lever has been fitted into any one of the positioning grooves; i.e., is in a locked state, the locked state is maintained by a relatively large composite force in which the urging force of the urging member is added to the weight of the operating lever itself. The locked state of the operating lever can therefore be stably maintained.

The operator thereafter manually performs an operation in which the operating lever is lifted up against the composite force (unlocked), whereby the operating lever is separated from the positioning groove and placed in the oblong guiding hole. As a result, the operating lever is switched from the locked state to the unlocked state. Unlocking operations are thus performed by lifting up the operating lever by hand. The weight of the body of the operator therefore does not act on the operating lever from above during the unlocking operation. The urging member does not bear excessive loads, and the urging force can therefore be set correspondingly smaller. The operating force during unlocking is therefore small, and operability is increased.

BRIEF DESCRIPTION OF THE DRAWINGS

Certain preferred embodiments of the present invention will be described in detail below, by way of example only, with reference to the accompanying drawings, in which.

DETAILED DESCRIPTION OF THE PREFERRED EMBODIMENTS

Figure 1:
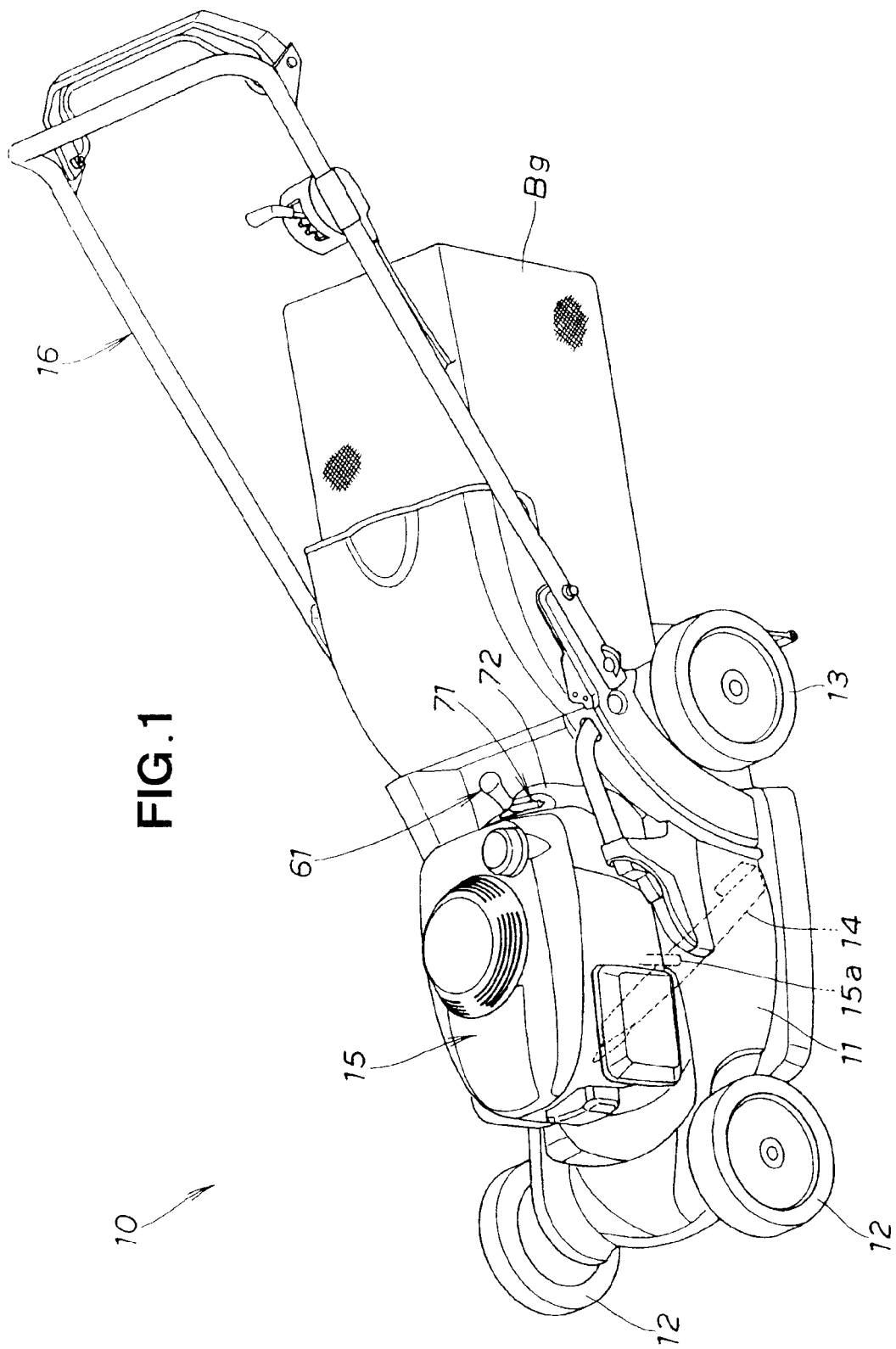
FIG. 1 is a perspective view illustrating a lawnmower according to the present invention.

As shown in FIG. 1, a lawnmower 10 is a walk-behind self-propelled work machine for cutting grass, and is composed of a housing 11 that is open at the bottom; left and right front wheels 12, 12 that are provided to the front part of the housing 11; left and right rear wheels 13, 13 that are provided to the rear part of the housing 11; a mowing blade 14 housed in the central interior part of the housing 11; an engine (power source) 15 provided to the upper part of the housing 11; and an operating handle 16 extending to the rear from the rear part of the housing 11.

The housing 11 also serves as a chassis. The engine 15 is laid over and bolted to the upper surface of the housing and thereby integrally assembled therewith. The engine 15 is a so-called vertical engine that has an output shaft 15a extending from a lower end of the engine into the housing 11 toward the lawn (not shown) below. The output shaft 15a is a driving shaft that is substantially perpendicular with respect to the lawn (ground).

Figure 2:
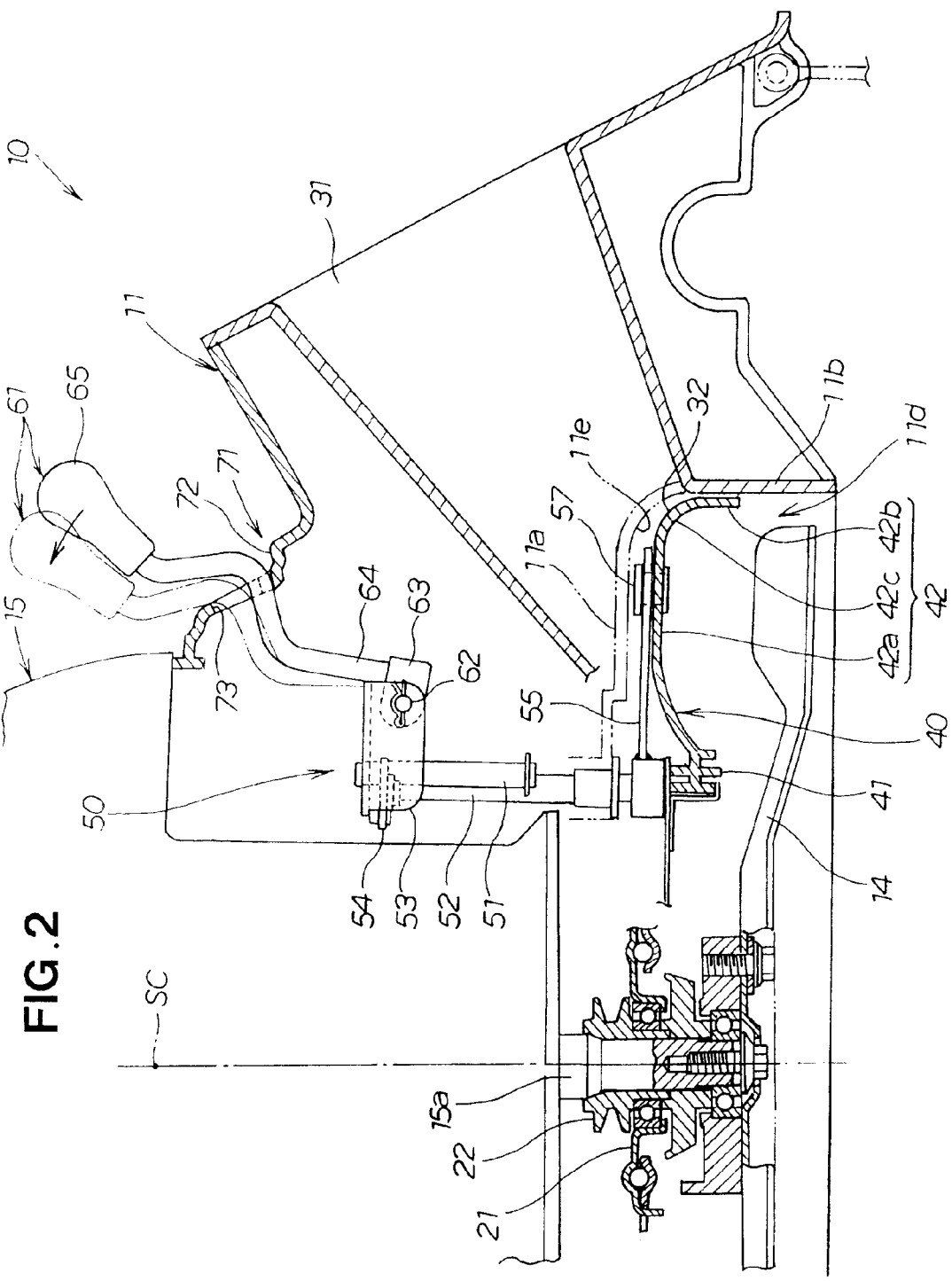
FIG. 2 is a cross-sectional view showing a major part of the lawnmower of FIG. 1.

As shown in FIG. 2, the blade 14 is attached to the output shaft 15a within the housing 11 via a clutch 21, and a driving pulley 22 is attached to the output shaft for transmitting driving force to a variable speed drive (not shown) for propulsion. The blade 14 is driven by the engine 15 via the clutch 21, whereby the blade 14 is capable of rotating about a shaft center SC of the output shaft 15a (is capable of rotating about the output shaft 15a) within the housing 11. The rotating blade 14 cuts away the grass and produces an airflow (swirl flow) within the housing 11. The swirl flow allows the grass cut by the blade 14 to be carried into and stored in a cut-grass container Bg. The rear wheels 13, 13 (see FIG. 1) are also driven by the engine 15 via the variable speed drive, whereby the lawnmower 10 is propelled forward automatically, and lawn-mowing operations are continued.

The lawnmower 10 is thus a so-called rotary lawnmower, in which the blade 14 housed in the housing 11, which is open at the bottom, is made to rotate over the grass, whereby the grass is cut. The grass cut by the blade 14 is referred to below simply as "cut grass."

Figure 3:
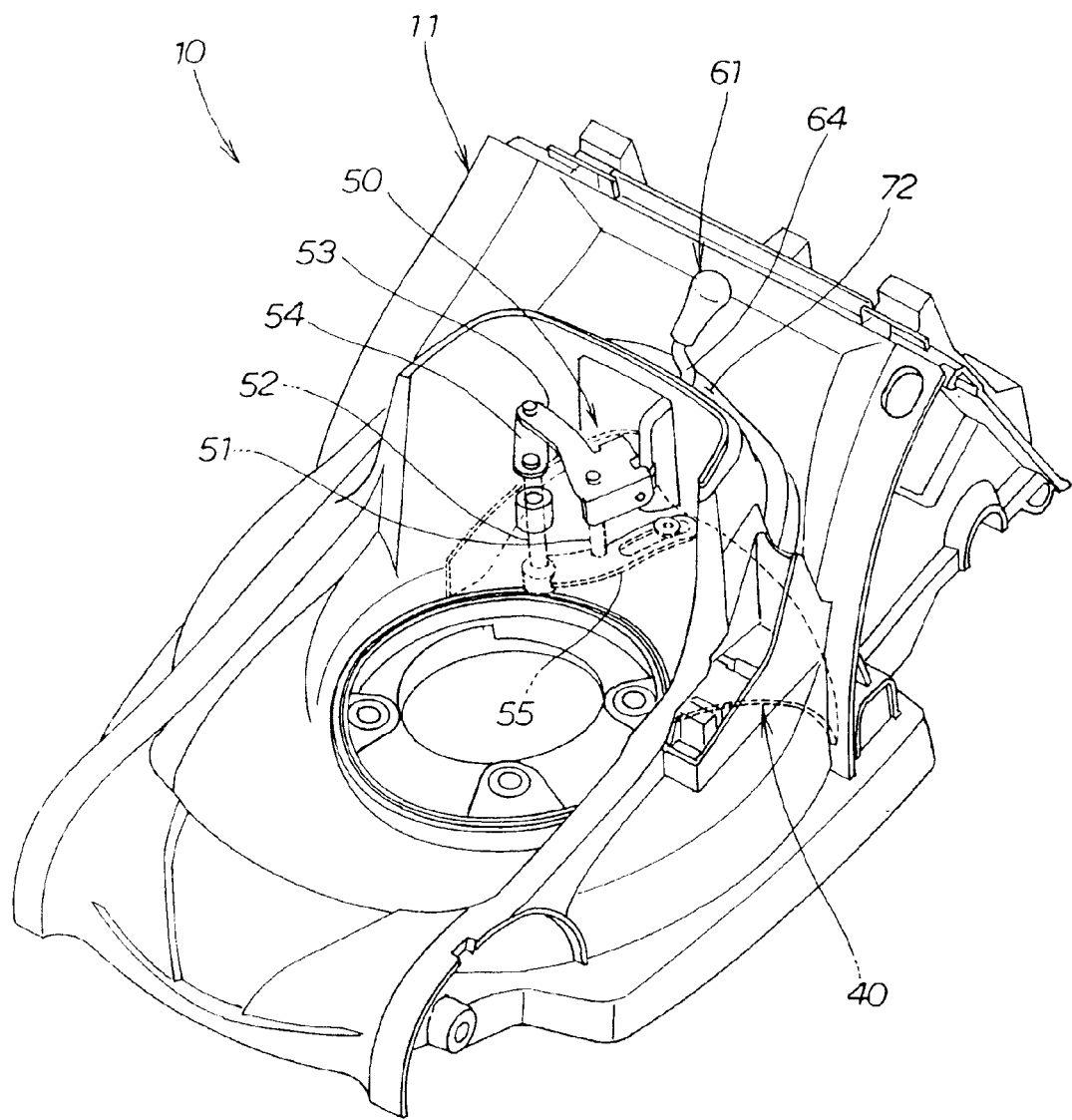
FIG. 3 is a perspective view showing a housing, a shutter, and a shutter operating mechanism of FIG. 2.
Figure 4:
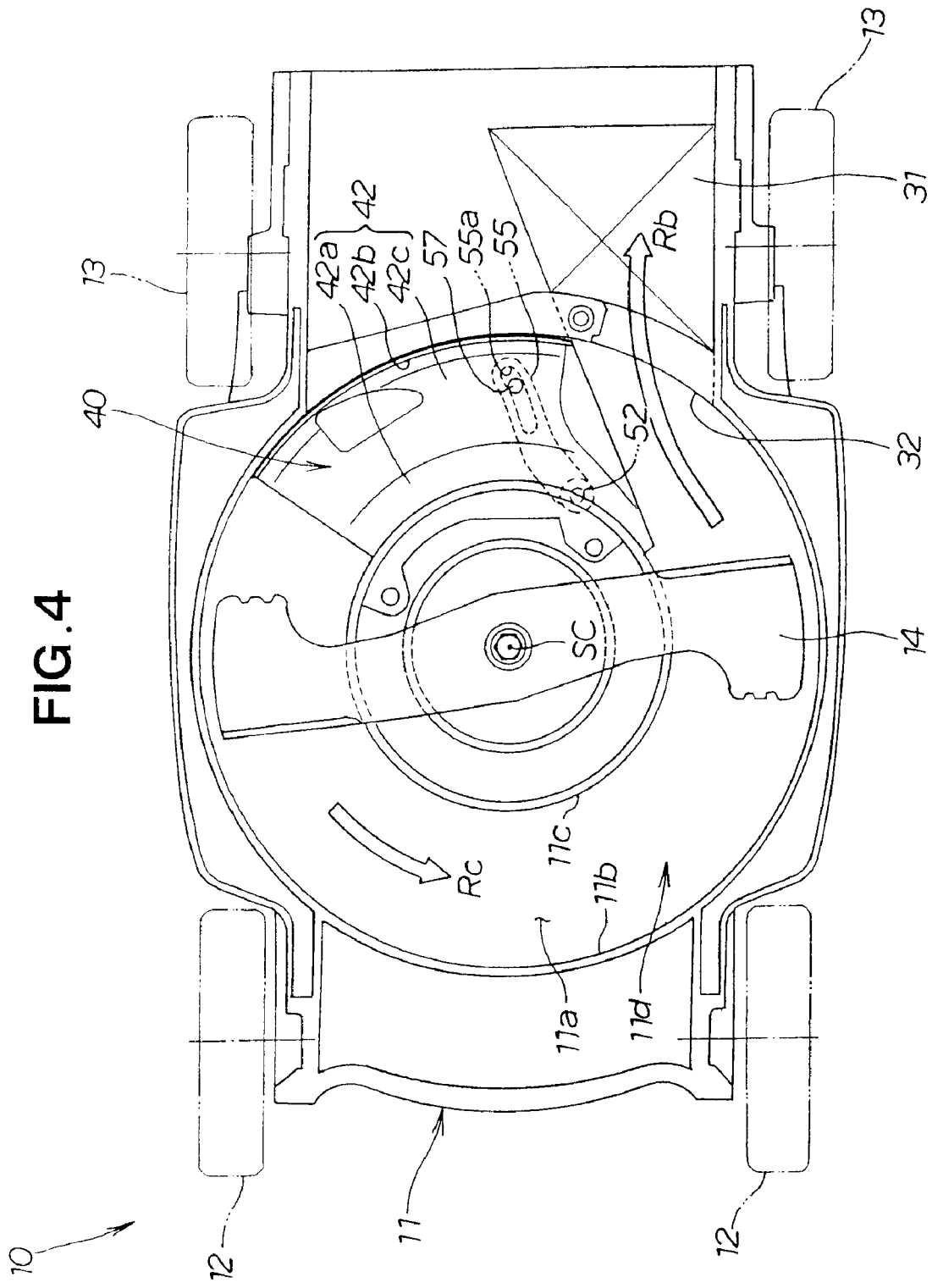
FIG. 4 is a bottom view showing the lawnmower with a shutter body of FIG. 2 placed in a full-open position.
Figure 5:
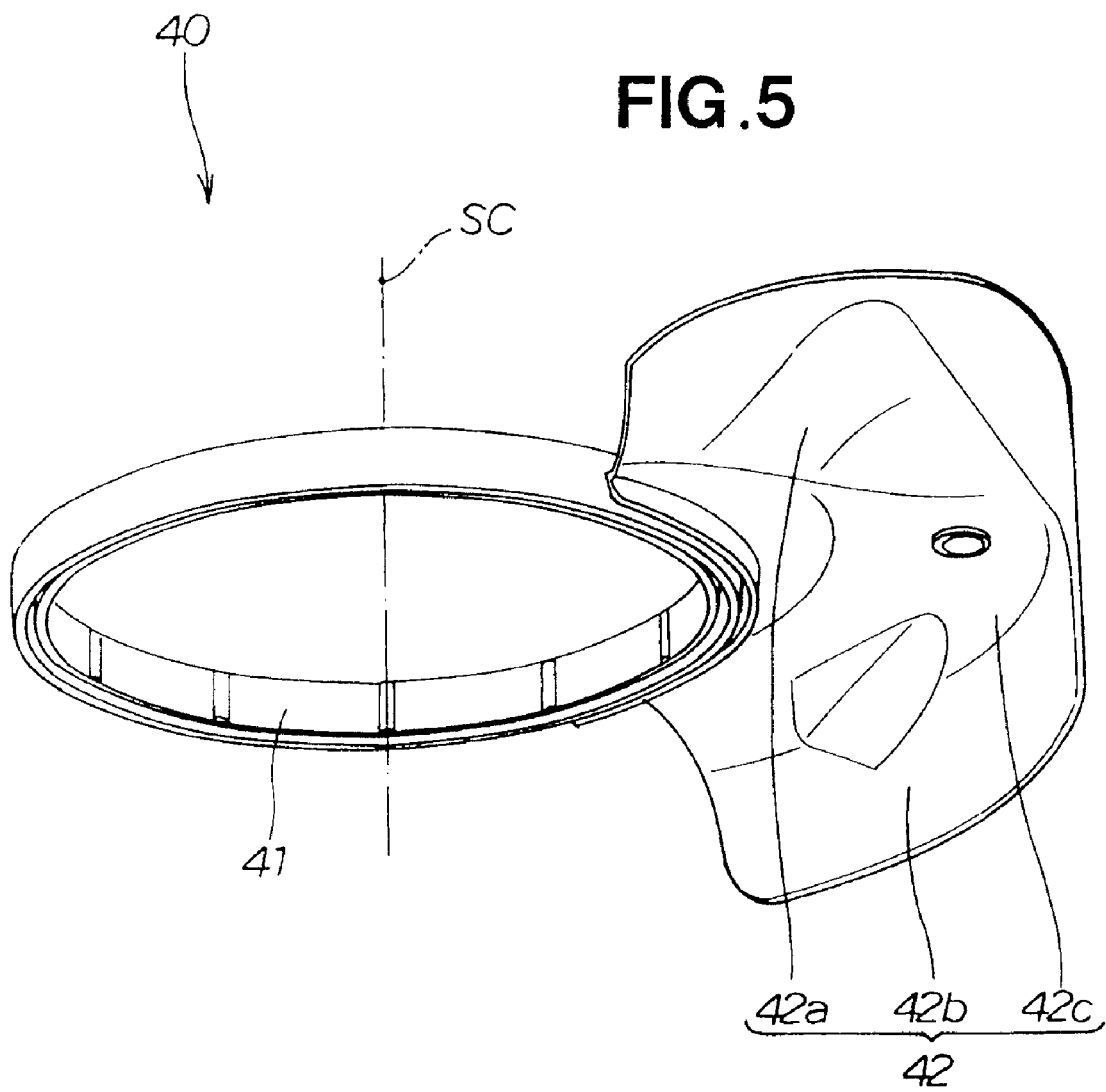
FIG. 5 is a perspective view showing the arrangement of the shutter of FIG. 2, as seen from below.

The housing 11 will be described in detail below. FIG. 3 shows the housing 11 as viewed from above. FIG. 4 shows the housing 11 as viewed from below. The housing 11 is open across the entirety of the lower end surface (the surface facing the lawn) only; i.e., is open at the bottom, as shown in FIGS. 1 through 4. The housing 11 is a scroll case (spiral case) provided with a scroll part 11d (see FIG. 4).

As shown in FIG. 4, in bagging mode, the scroll part 11d causes the grass cut by the blade 14 to revolve in the direction of an arrow Rc (revolving direction Rc) within the housing 11 and causes the grass to move toward a discharge conduit 31 for cut grass as shown by arrow Rb.

The housing 11 is composed of a top plate 11a, an outer cylinder part 11b, an inner cylinder part 11c, the scroll part 11d, and the discharge conduit 31 for cut grass, as shown in FIGS. 2 and 4. The top plate 11a blocks the upper end of the housing 11 and is a substantially horizontal, substantially annular plate as viewed from above. The outer cylinder part 11b is a cylindrical member that is centered about the output shaft 15a, extending downward from the outer edge of the top plate 11a. The inner cylinder part 11c is a cylindrical member that is centered about the output shaft 15a, extending downward from the inner edge of the top plate 11a. The inner cylinder part is configured to have a smaller diameter than the outer cylinder part 11b.

The discharge conduit 31 for cut grass extends to the rear (more specifically, upward and to the rear) from the outer cylinder part 11b in a direction tangential to the outer cylinder part 11b. The discharge conduit 31 for cut grass has on the front end a conduit aperture 32 that adjoins the housing 11. The discharge conduit is configured so that a grass bag or other implementation of the cut-grass container Bg (see FIG. 1) can be attached to the rear end. The cut-grass container Bg can be detached from the discharge conduit 31 for cut grass. The cut grass is carried to the discharge conduit 31 for cut grass while being made to revolve about the output shaft 15*a* in the interior part of the housing 11.

As is made clear from the description above, the direction in which the discharge conduit 31 for cut grass extends from the outer cylinder part 11*b* is aligned with the rotational direction Rc of the blade 14. In other words, the discharge conduit 31 for cut grass extends in a direction tangential to the rotational trajectory of the blade 14. The conduit aperture 32 opens in the rotational direction Rc of the blade 14.

The scroll part 11*d* is a space that is substantially annular when viewed from above and is bounded by the top plate 11*a*, the outer cylinder part 11*b*, and the inner cylinder part 11*c*, as shown in FIG. 4. The corner between the top plate 11*a* and the outer cylinder part 11*b* and the corner between the top plate 11*a* and the inner cylinder part 11*c* in the space 11*d* are formed so that the cross-sections have relatively gentle, arcuate shapes. The scroll part 11*d* is the conduit in which the cut grass revolves and is formed having a downward U-shaped cross section when viewed from the side. The configuration of the scroll part is such that cut grass moves toward the discharge conduit 31 for cut grass while revolving. In other words, the scroll part 11*d* is continuous with the conduit aperture 32 of the discharge conduit 31 for cut grass.

A shutter 40 is positioned on the inner circumferential surface of the housing 11 (the inner circumferential surface of the outer cylinder part 11*b*), as shown in FIG. 2. The shutter 40 is composed of a rotating plate 41, which is rotatably attached to the top plate 11*a* in the inside of the housing 11; and a shutter body 42, which is attached to the outer edge of the rotating plate 41.

The rotating plate 41 is an annular, horizontal plate that is positioned concentrically with the shaft center SC. As shown in FIGS. 2, 3, 5, and 6, the shutter body 42 is formed from a bent plate member and is composed of a horizontal part 42*a*, which extends from the outer edge of the rotating plate 41 toward the outer cylinder part 11*b* of the housing 11; and a vertical part 42*b*, which bends from the end of the horizontal part 42*a* and descends along the inner circumferential surface of the outer cylinder part 11*b*. A corner 42*c* between the horizontal part 42*a* and the vertical part 42*b* is formed having a relatively gentle arcuate shape that matches an outside corner 11*e* of the scroll part 11*d*. The entirety of the shutter body 42 is substantially fan-shaped so as to be centered about the shaft center SC. The shutter body 42 thus configured can rotate along with the rotating plate 41 about the shaft center SC.

As is made clear from the description above, the shutter 40 has the shutter body 42 provided to the conduit aperture 32 that adjoins the housing 11 on the discharge conduit 31 for cut grass. The shutter body 42 can revolve with the shaft center SC of the output shaft 15*a* as the center of revolution. The shutter body 42 can be used to close, open, or adjust the degree of opening of the conduit aperture 32.

Figure 6:
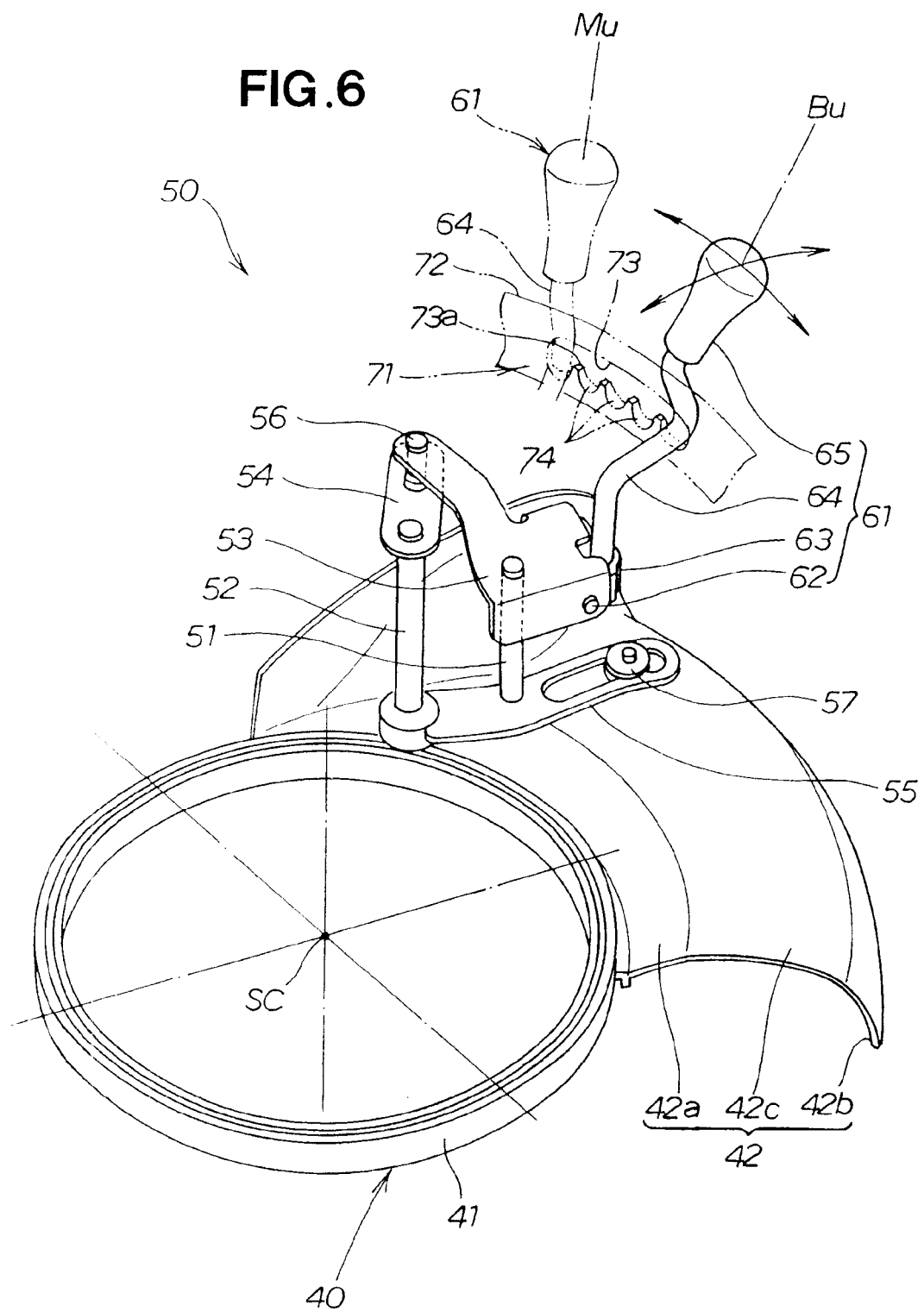
FIG. 6 is a perspective view showing the shutter, the shutter operating mechanism and an operating guide part of FIG. 3.

The shutter 40 can be opened and closed using a shutter operating mechanism 50, as shown in FIGS. 2, 3, and 6. The shutter operating mechanism 50 is composed of a first shaft 51, a second shaft 52, a first link arm 53, a second link arm 54, a third link arm 55, an operating lever 61, and an operating guide part 71.

As shown in FIGS. 2 and 3, the first shaft 51 and the second shaft 52 are positioned above the top plate 11*a* on the rear part of the housing 11 and are also positioned parallel to the output shaft 15*a* of the engine 15.

Figure 7:
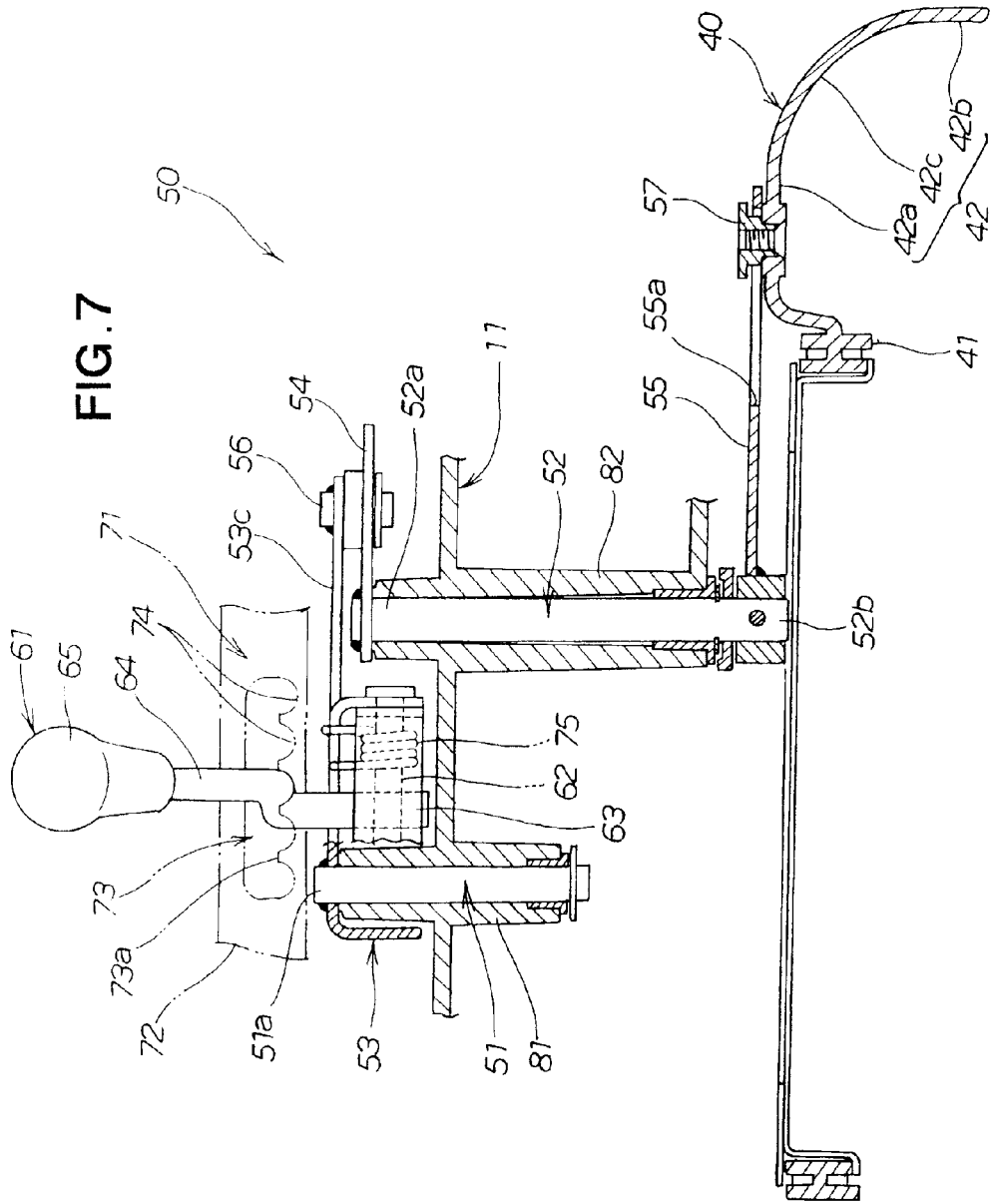
FIG. 7 is a cross-sectional view showing the housing, the shutter, the shutter operating mechanism and the operating guide part of FIG. 3, as seen from sideways.

The housing 11 has a first shaft bearing part 81 and a second shaft bearing part 82, as shown in FIG. 7. The first shaft 51 is rotatably attached to the housing 11 by the first shaft bearing part 81 so that movement is restricted in the axial direction. The second shaft 52 is positioned adjoining and parallel to the first shaft 51. The second shaft 52 is rotatably attached to the housing 11 by the second shaft bearing part 82 so that movement is restricted in the axial direction.

Figure 8:
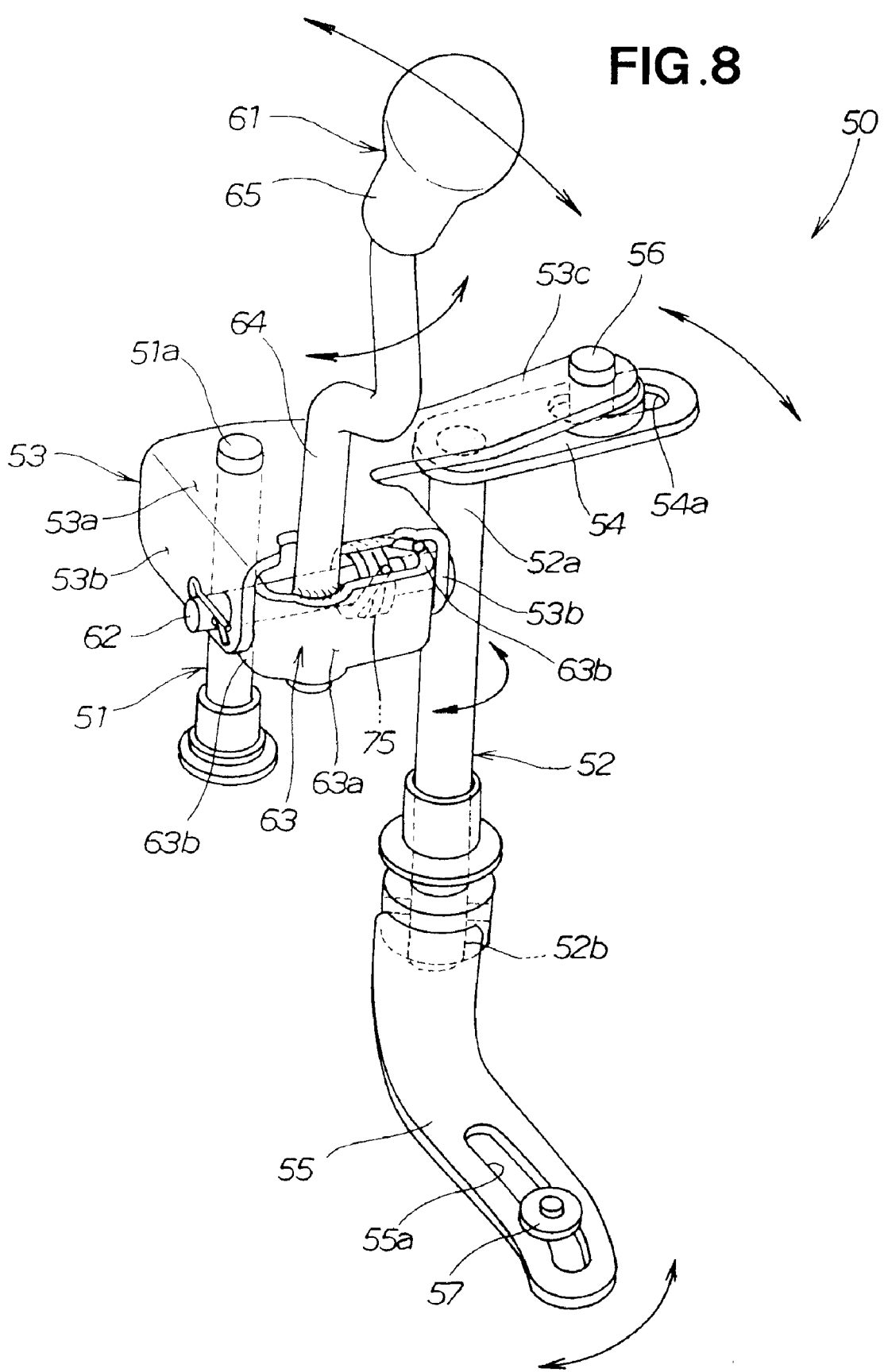
FIG. 8 is a perspective view showing the shutter operating mechanism of FIG. 6.
Figure 9:
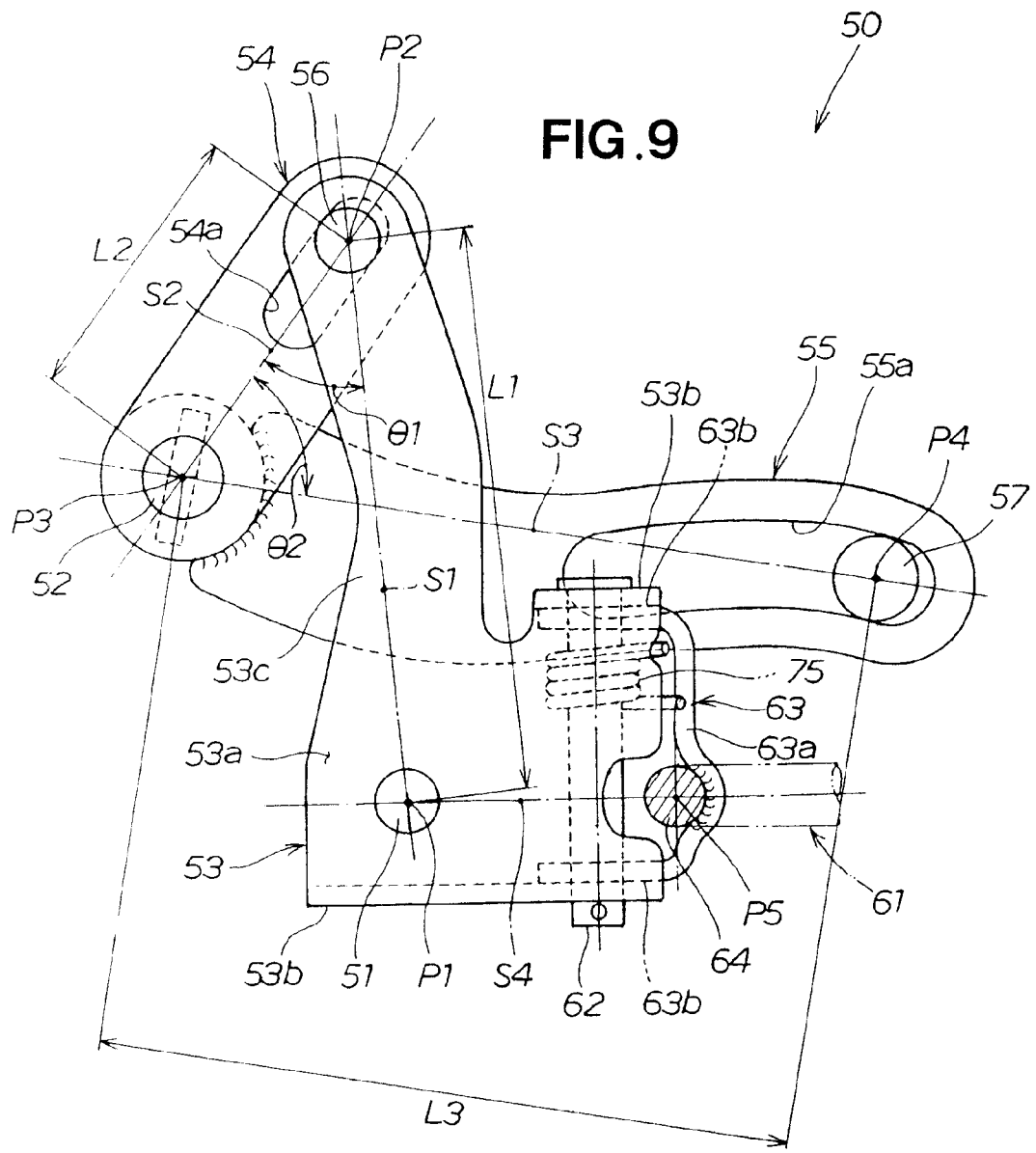
FIG. 9 is a top plan view showing the shutter operating mechanism of FIG. 6.

The first link arm 53 is attached to an upper end part 51*a* of the rotatable first shaft 51 so that relative rotation is restricted, as shown in FIGS. 7 through 9. The first link arm 53 can therefore swing with the first shaft 51 as the center of swinging. The first link arm 53 has the operating lever 61. The first shaft 51 may also be affixed to the housing 11. The first link arm 53 in such cases is rotatably attached to the first shaft 51 and can thereby swing with the first shaft 51 as the center of swinging.

More specifically, the first link arm 53 is a substantially upside-down-U-shaped member and is composed of a horizontal plate 53*a* and a pair of vertical plates 53*b*, 53*b* that extend downward from the left and right ends of the horizontal plate 53*a*. The horizontal plate 53*a* is attached to the upper end part 51*a* of the first shaft 51 and has an arm part 53*c* that extends toward the second shaft 52. A first linking pin 56 that is parallel to the second shaft 52 is present on the end of the arm part 53*c*.

The second link arm 54 is attached to an upper end part 52*a* of the rotatable second shaft 52 so that relative rotation of the proximal end part is restricted, as shown in FIGS. 7 through 9. The second link arm 54 can therefore swing with the second shaft 52 as the center of swinging. The second link arm 54 extends toward the first linking pin 56 and has on the distal end part a long hole 54*a* that is linked to the first linking pin 56. The long hole 54*a* is thin and passes through vertically along the longitudinal direction of the second link arm 54.

The shutter body 42 of the shutter 40 has a second linking pin 57 that protrudes upward, as shown in FIGS. 6 and 7. The second linking pin 57 is parallel to the second shaft 52.

The third link arm 55 is attached to a lower end part 52*b* of the second shaft 52 so that relative rotation of the proximal end is restricted, as shown in FIGS. 7 through 9. The third link arm 55 can therefore swing with the second shaft 52 as the center of swinging. The third link arm 55 extends toward the second linking pin 57 and has on the distal part a long hole 55*a* that is linked to the second linking pin 57. The long hole 55*a* is thin and passes through vertically along the longitudinal direction of the third link arm 55.

As shown in FIGS. 7 through 9, the operating lever 61 is composed of a horizontal supporting shaft 62 that is attached to the first link arm 53, a lever proximal-end member 63 that is rotatably supported by the supporting shaft 62, a lever part 64 that is affixed to the lever proximal-end member 63, and a grip 65 that is affixed to the upper end of the lever part 64. The supporting shaft 62 is laid across the pair of the vertical plates 53*b*, 53*b*. The lever proximal-end member 63 is a horizontally-facing substantially U-shaped member and is composed of a vertical plate 63*a* that is parallel to the supporting shaft 62, and a pair of left and right lateral plates 63*b*, 63*b* that extend from the left and right ends of the vertical plate 63*a* toward the supporting shaft 62. The vertical plate 63*a* is positioned to the rear of the housing 11 in relation to the supporting shaft 62. The pair of the left and right lateral plates 63*b*, 63*b* is rotatably fit to the supporting shaft 62. The basal end of the lever part 64 extends upward from the vertical plate 63*a* of the lever proximal-end member 63.

The following definitions will be employed when the shutter operating mechanism 50 is viewed from the axial direction of the first shaft 51, as shown in FIG. 9. A straight line S1 from a center P1 (first point P1) of the first shaft 51 to a center P2 (second point P2) of the first linking pin 56 is the first straight line 51. A straight line S2 from the center P2 (second point P2) of the first linking pin 56 to a center P3 (third point P3) of the second shaft 52 is the second straight line S2. A straight line S3 from the center P3 (third point P3) of the second shaft 52 to a center P4 (fourth point P4) of the second linking pin 57 is the third straight line S3. A straight line S4 from the center P1 (first point P1) of the first shaft 51 to a center P5 (fifth point P5) of the lever part 64 is the fourth straight line S4.

The third point P3 and the fourth and fifth points P4, P5 are positioned so as to be divided to the left and right with respect the first straight line S2. The third straight line S3 is substantially perpendicular to the first straight line S2. The fourth straight line S4 is substantially parallel to the third straight line S3. An angle $\theta1$ of the second straight line S2 with respect to the first straight line S1 and an angle $\theta2$ of the third straight line S3 with respect to the second straight line S2 are both acute angles and are set in a range of, e.g., 30° to 60°.

A length L2 of the second straight line S2 is set to be shorter by, e.g., one half with respect to a length L1 of the first straight line S2. A length L3 of the third straight line S3 is set to be longer by, e.g., a factor of two with respect to the length L2 of the second straight line S2. The third point P3 is therefore positioned closer to the first point P1 than the second point P2. The second shaft 52 therefore adjoins the first shaft 51.

The operating guide part 71 guides (prescribes) the operating direction of the operating lever 61 and is formed on a rear wall plate 72 of the housing 11, as shown in FIGS. 2, 6, and 7. The operating guide part 71 is composed of a long, thin guiding hole 73 disposed horizontally in the widthwise direction of the housing 11; and a plurality of positioning grooves 74, which is aligned in a row along a portion 73a (lower edge 73a) below the edge that forms the oblong guiding hole 73.

The oblong guiding hole 73 is a horizontal hole for guiding the lever part 64 of the operating lever 61 in the swinging direction of the first link arm 53 (the horizontal direction) and is formed as a straight line. The plurality (e.g., five) of the positioning grooves 74 is vertical grooves open at the top for setting the desired positions of the swinging operation of the operating lever 61 and all communicate with the oblong guiding hole 73. The position of the positioning groove 74 that faces one end of the oblong guiding hole 73 prescribes the full-closed position, and the position of the positioning groove 74 that faces the other end of the oblong guiding hole 73 prescribes the completely-open position. Each of the intervals of the positioning grooves 74 may be set to, e.g., a 25% degree of opening of the shutter body 42.

When the operating force is relieved, the operating lever 61 is urged by an urging member 75 in a direction for fitting into one of the plurality of the positioning grooves 74 from the oblong guiding hole 73, as shown in FIGS. 7 through 9. The urging member 75 comprises, e.g., a torsion coil spring (return spring). The coil of the torsion coil spring is fit into the supporting shaft 62.

Figure 10:
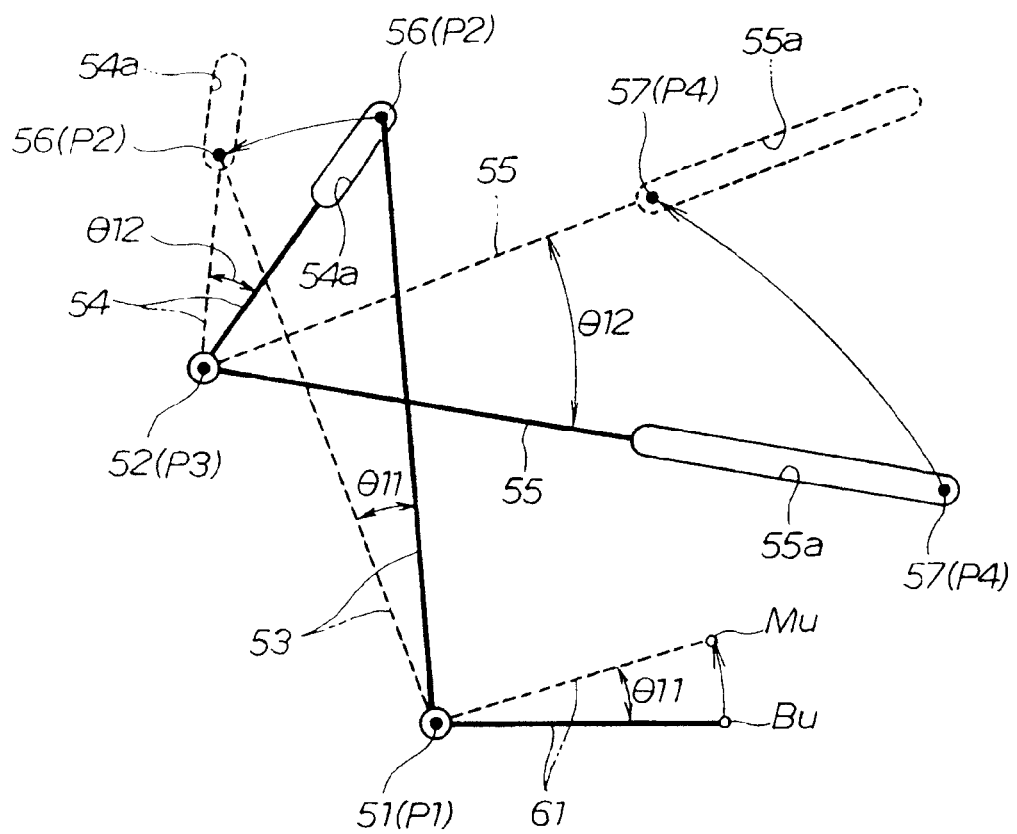
FIG. 10 is a diagrammatical view showing the shutter operating mechanism of FIG. 9.

The operation of the shutter operating mechanism 50 will be described next with reference to FIG. 10. FIG. 10 schematically shows the shutter operating mechanism 50 shown in the aforedescribed FIG. 9. The shutter operating mechanism 50 shown in the aforedescribed FIG. 9 is shown by solid lines in FIG. 10. The shutter operating mechanism 50 is displaced to the state shown by broken lines as a result of the operating lever 61 shown by solid lines being operated to swing counterclockwise in FIG. 10. The operation of the shutter operating mechanism 50 will be described below.

The operating lever 61 here is at a first operating position Bu shown by solid lines. The first operating position Bu corresponds to the bagging operational position Bu shown in FIG. 6, i.e., to the full-open operational position of the shutter.

The operating lever 61 is then operated to swing counterclockwise in FIG. 10 by an angle $\theta11$ to a second operating position Mu. The second operating position Mu shown by broken lines corresponds to the mulching operational position Mu shown in FIG. 6, i.e., to the full-close operational position of the shutter.

As a result of the operating lever 61 being operated to swing counterclockwise in FIG. 10 by the angle $\theta11$ (e.g., 15°), the first link arm 53 swings counterclockwise in FIG. 10 by the angle $\theta11$. The first linking pin 56 of the first link arm 53 here pushes on the edge of the long hole 54a, whereby the second link arm 54 swings counterclockwise in FIG. 10 by an angle $\theta12$ (e.g., 30°). The second shaft 52 therefore rotates counterclockwise in FIG. 10, whereby the third link arm 55 swings counterclockwise in FIG. 10 by the angle $\theta12$. The edge of the long hole 55a of the third link arm 55 here pushes on the second linking pin 57, whereby the second linking pin 57 is displaced counterclockwise in FIG. 10 by the angle $\theta12$ along the long hole 55a. As a result, the second linking pin 57 rotationally displaces the shutter 40 shown in FIG. 4.

The overall operation of the lawnmower 10 having the aforedescribed configuration will be described next.

The operating lever 61 is set to the bagging position Bu, as shown by the solid lines in FIG. 6, whereby the shutter body 42 is positioned at the full-open position (100% degree of opening) shown in FIG. 4. The conduit aperture 32 is fully open, whereby the lawnmower 10 is set in a format for employing the bagging mode, and the grass cut by the blade 14 (cut grass) can be stored in the cut-grass container Bg (see FIG. 1).

Figure 11:
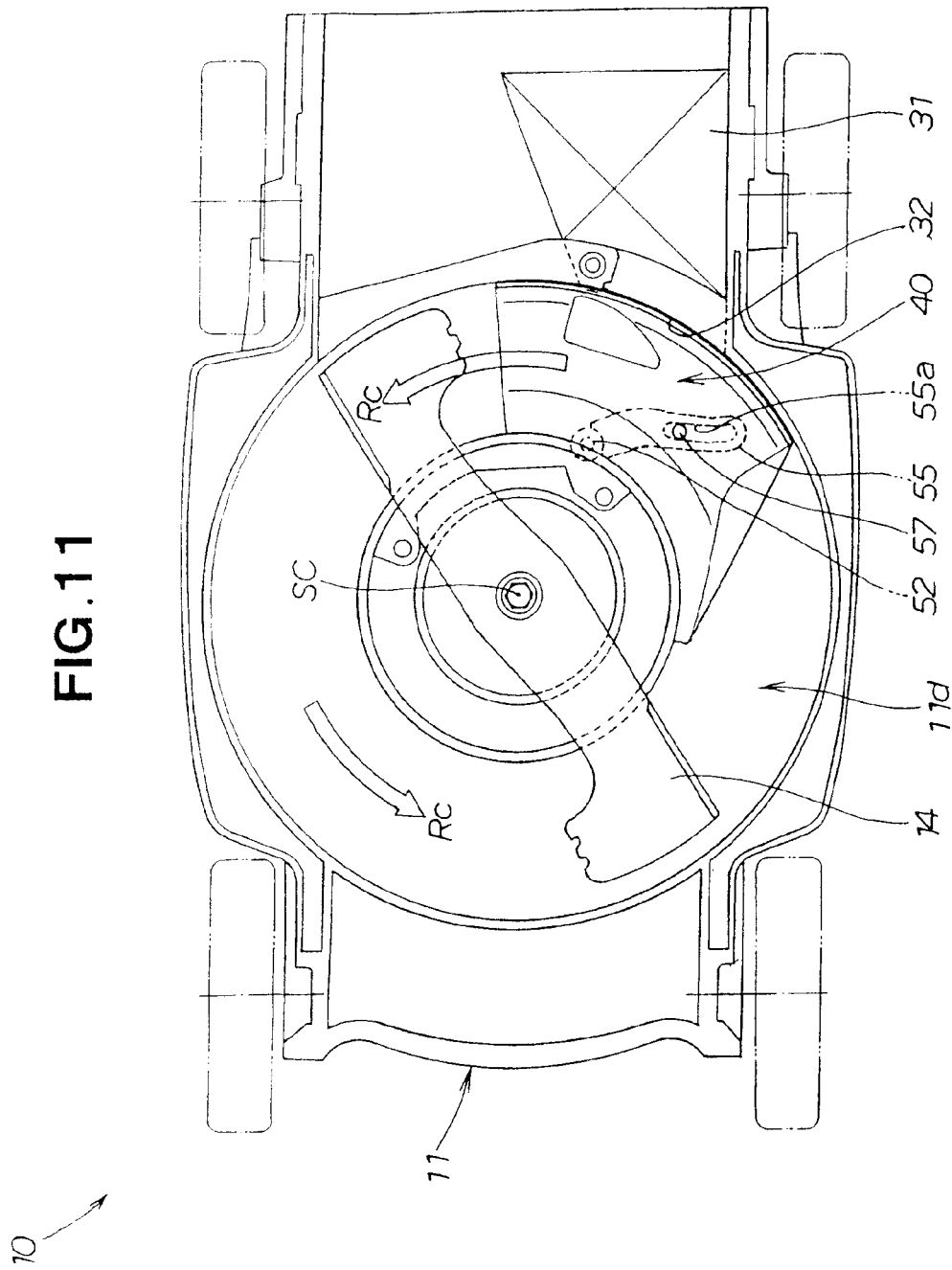
FIG. 11 is a bottom view showing the lawnmower with the shutter body of FIG. 2, placed in a full-close position.

The operating lever 61 is thereafter set at the mulching position Mu, as shown by the imaginary lines in FIG. 6, whereby the shutter body 42 is positioned at the full-close position (0% degree of opening) shown in FIG. 11. The conduit aperture 32 is completely closed by the shutter body 42, whereby the lawnmower 10 is set in a format for employing the mulching mode, and the cut grass is cut even more finely within the housing 11 and can be discharged to the area below the housing 11.

By setting the operating lever 61 shown in FIG. 6 to any position between the bagging position Bu and the mulching position Mu, the shutter body 42 can be used to open the conduit aperture 32 to the desired degree, whereby the lawnmower 10 is set in a format for employing an intermediate mode (a mode intermediate between the bagging mode and the mulching mode), and part of the cut grass can be returned to the ground while the remainder is stored in the cut-grass container Bg (see FIG. 1).

Switching can thus be appropriately performed between (1) the bagging mode in which the shutter body 42 is fully open, and the cut grass is stored in the cut-grass container Bg, (2) the mulching mode in which the shutter body 42 is fully closed, and the cut grass is discharged to the area below the housing 11, and (3) intermediate modes between the bagging mode and the bagging mode, in which the shutter body 42 is set to the desired degree of opening.

Operating the shutter body 42 to the desired degree of opening enables the discharge format of the cut grass to be precisely and freely set according to the state of the lawn, finished appearance, or personal preference. By switching to an intermediate mode, the discharge flow rate of cut grass discharged to the cut-grass container Bg can be reduced. As a result, the time required for cut grass to accumulate in the cut-grass container Bg is extended, and the cut-grass container Bg can be switched out less frequently.

A summary of the aforedescribed configuration and operation is as follows.

In the present embodiment, the shutter operating mechanism 50 comprises the assembly of the first shaft 51, the second shaft 52, the first link arm 53, the second link arm 54, and the operating lever 61, as shown in FIGS. 6 and 9. The second shaft 52 is positioned adjoining with and parallel to the first shaft 51 and is linked to the shutter 40. Operating the operating lever 61 causes the first link arm 53 to swing, the first shaft 51 being the center of the swinging. The second link arm 54 is swung by the first link arm 53 and causes the second shaft 52 to rotate. As a result, the second shaft 52 rotates, whereby the shutter 40 is made to open or close.

Thus, since the first and second shafts 51, 52 and the first and second link arms 53, 54 are assembled, the ratio Ra=L2/L1 of the length L2 (see FIG. 9) of the second link arm 54 to the length L1 (see FIG. 9) of the first link arm 53, i.e., the ratio of the arm lengths Ra, can be made small. By setting the arm-length ratio Ra to be small, the ratio Rθ=θ12/θ11 of the swing angle θ12 (see FIG. 10) of the second link arm 54 to the swing angle θ11 (see FIG. 10) of the first link arm 53 and the operating lever 61 is increased. As a result, the opening and closing angle θ12 of the shutter 40 is made larger than the operating angle θ11 of the operating lever 61.

The opening and closing angle θ12 over which the shutter 40 revolves from fully open to fully closed is determined according to the size of the housing 11 and the size of the aperture 32 (conduit aperture 32) of the discharge conduit 31 for cut grass. The aforedescribed arm-length ratio Ra may be set smaller in order to reduce the operating angle θ11 of the operating lever 61 in relation to the opening and closing angle θ12. By reducing the operating angle θ11 of the operating lever 61, the operating angle θ11 can be kept within a range in which the operating lever 61 does not interfere with the engine 15 (see FIG. 2) or other members, and the operating angle θ12 needed to open and close the shutter 40 can be adequately provided.

The second shaft 52 is positioned adjoining with and parallel to the first shaft 51. The first and second link arms 53, 54 can therefore be brought into proximity. As a result, the space occupied by the shutter operating mechanism 50 can be reduced. The shutter operating mechanism 50 can therefore be adequately positioned even when the lawnmower 10 is small in scale.

The second shaft 52 is linked to the shutter 40 via the third link arm 55 in the present embodiment, as shown in FIGS. 6 and 9. The second shaft 52 can therefore be disposed in the desired position relative to the shutter 40. The second shaft 52 can therefore be disposed in a more appropriate position in the small-scale lawnmower 10 so as to allow the space occupied by the shutter operating mechanism 50 to be reduced.

In the present embodiment, when the operating lever 61 has been fitted into any one of the positioning grooves 74; i.e., is in a locked state, as shown in FIGS. 6 and 7, the locked state is maintained by a relatively large composite force in which the urging force of the urging member 75 is added to the weight of the operating lever 61 itself. The locked state of the operating lever 61 can therefore be stably maintained.

The operator thereafter manually performs an operation in which the operating lever 61 is lifted up against the composite force (unlocked), whereby the operating lever 61 is separated from the positioning groove 74 and placed in the oblong guiding hole 73. As a result, the operating lever 61 is switched from the locked state to the unlocked state. Unlocking operations are thus performed by lifting up the operating lever 61 by hand. The weight of the body of the operator therefore does not act on the operating lever 61 from above during the unlocking operation. The urging member 75 does not bear excessive loads, and the urging force can therefore be set correspondingly smaller. The operating force during unlocking is therefore small, and ope73rability is increased.

The lawnmower 10 of the present invention is appropriate for use as a rotary lawnmower in which both bagging modes and mulching modes can be employed.

Obviously, various minor changes and modifications of the present invention are possible in light of the above teaching. It is therefore to be understood that within the scope of the appended claims the invention may be practiced otherwise than as specifically described.

What is claimed is:

1. A lawnmower comprising:
    a cutting blade rotatable about a shaft extending substantially perpendicularly to a lawn;
    an open-bottomed housing for housing the blade;
    a conduit for discharging cut grass, the conduit extending rearwardly from the housing and designed to allow attachment thereto of a cut-grass container;
    a shutter capable of revolving about the shaft for adjusting a degree of opening of the cut-grass discharge conduit; and
    a shutter operating mechanism for operating the shutter,
    wherein the shutter operating mechanism has an operating lever, a first shaft, a second shaft, a first link arm, and a second link arm;
    the first shaft is positioned on the housing,
    the second shaft is positioned adjacent to and parallel to the first shaft, is rotatably attached to the housing and is linked to the shutter,
    the first link arm is swingable about the first shaft and has the operating lever attached thereto, and
    the second link arm is attached to the second shaft such that rotation of the second link arm relative to the second shaft is restricted but the second link arm is capable of swinging with the second shaft as the second shaft rotates, said second link arm being linked to the first link arm such that the second link arm is swing-driven about the second shaft by the first link arm.

2. The lawnmower of claim 1, wherein the second shaft is linked to the shutter via a third link arm whereby rotation of the second shaft due to swinging of the second link arm causes said shutter to move.

3. The lawnmower of claim 1, further comprising an operating guide part for guiding the operating lever through an operating direction,
    wherein the operating guide part has a horizontal oblong guiding hole and a plurality of positioning grooves, the oblong guiding hole being for guiding the operating lever in a swinging direction of the first link arm, and the positioning grooves being aligned in a row along a lower edge of the oblong guiding hole,
    the positioning grooves comprise open-topped vertical grooves for setting the operating lever to a desired swing-operating position, and
    the operating lever is urged by an urging member in a direction for fitting into any one of the positioning grooves from the oblong guiding hole when an operating force is discontinued.

4. The lawnmower of claim 1, further comprising a third link arm, said third link arm extending between the shutter and the second shaft, wherein the second shaft has a first end and a second, opposite end, said second link arm being attached to the first end of the second shaft while said third link arm is attached to said second end of said second shaft.

5. The lawnmower of claim 2, wherein the second shaft has a first end and a second, opposite end, said second link arm being attached to the first end of the second shaft while said third link arm is attached to said second end of said second shaft.

6. A lawnmower comprising:
- a cutting blade rotatable about a shaft extending substantially perpendicularly to a lawn;
- an open-bottomed housing for housing the blade;
- a conduit for discharging cut grass, the conduit extending rearwardly from the housing and designed to allow attachment thereto of a cut-grass container;
- a shutter capable of revolving about the shaft for adjusting a degree of opening of the cut-grass discharge conduit; and
- a shutter operating mechanism for operating the shutter,
- wherein the shutter operating mechanism has an operating lever, a first shaft, a second shaft, a first link arm, a second link arm, and a third link arm;
- the first shaft is positioned on the housing,
- the second shaft is positioned adjacent to and parallel to the first shaft, said second shaft being rotatably attached to the housing and having a first end and a second end;
- the first link arm is swingable about the first shaft and has the operating lever attached thereto;
- the second link arm extends between the first link arm and the second shaft and is attached to the first end of the second shaft such that rotation of the second link arm relative to the second shaft is restricted but the second link arm is capable of swinging with the second shaft as the second shaft rotates, said second link arm being secured to the first link arm such that the second link arm is swing-driven about the second shaft by the first link arm; and,
- the third link arm extends between the shutter and the second shaft and is attached to the second end of the second shaft such that rotation of the second shaft causes swinging movement of the third link arm and sliding movement of the shutter attached thereto.

* * * * *